Patented Aug. 5, 1952

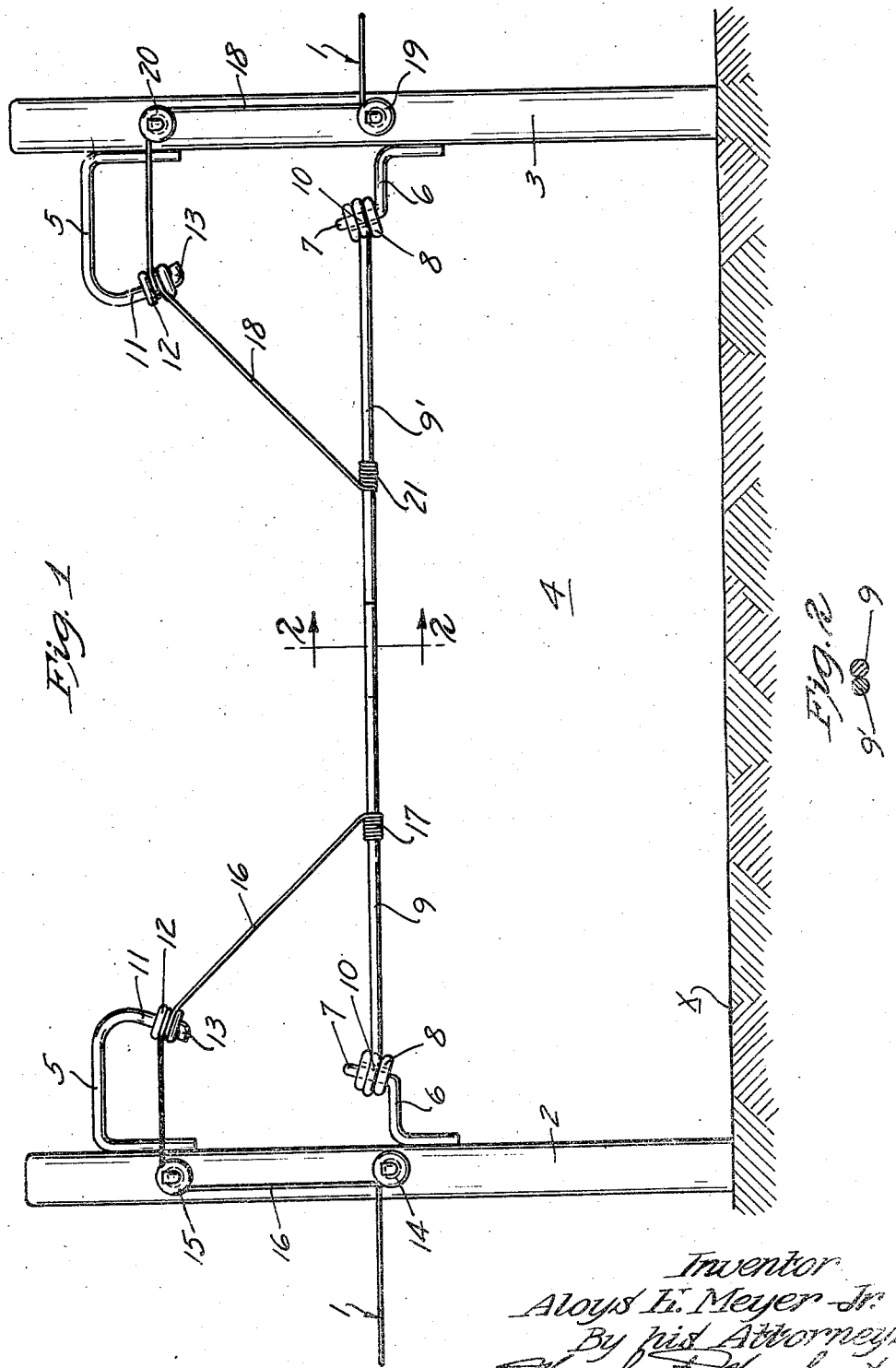

2,605,565

UNITED STATES PATENT OFFICE 2,605,565

ELECTRIFIED GATE CONSTRUCTION

Aloys H. Meyer, Jr., Melrose, Minn.

Application August 19, 1950, Serial No. 180,414

3 Claims. (Cl. 39—84)

My invention relates to gates used in connection with electrically charged fences, and has for its primary object the provision of an electrically charged barrier which will permit movement through a passageway normally closed thereby of a vehicle or the like without the necessity of shutting off the current therefor, but will effectively prevent passage therethrough of livestock.

Another highly important object of my invention is the provision of a gate or barrier of the above type which may be pivotally moved to an open position by engagement therewith of a vehicle or the like, and which will automatically return to a closed position when the vehicle has moved through the passageway.

A still further object of my invention is the provision of a movable electrified barrier of the above type which is partially supported by the conductor wire associated therewith.

Still another object of my invention is the provision of a gate or barrier as set forth which is simple and inexpensive to build, which is effective in operation, and which is rugged in construction and durable in use.

Generally stated, the invention consists of the novel devices, combinations of devices, and arrangement of parts hereinafter described and defined in the claims.

In the accompanying drawings, which illustrate the invention, like characters indicate like parts throughout the several views.

Referring to the drawings:

Fig. 1 is a fragmentary view in elevation of my novel gate or barrier applied to an electrified fence; and Fig. 2 is a detail in section taken on the line 2—2 of Fig. 1.

In the embodiment of my invention illustrated, an electrified fence is shown as comprising an electrical conductor wire 1 which may be assumed to encircle a desired area and be supported in predetermined spaced relation to the ground by a pair of spaced gate posts or the like 2 and 3, and by other posts or supports, not shown, but commonly used. The conductor wire 1 is adapted to be electrically charged by a conventional source of current such as a fence charger or generator, not shown, and one side of which is normally grounded, whereby when an animal confined in the field encompassed by the conductor touches the same, a circuit will be completed through the animal to the ground. Obviously the resultant mild shock to the animal will cause it to move away from the fence and thereafter avoid contact with the same.

The gate posts 2 and 3 define opposite sides of a passageway 4 for movement therethrough of livestock or vehicles, said passageway being closed by novel gate or barrier means normally extending transversely thereof. I provide upper and lower pairs of brackets 5 and 6 one of each pair being rigidly secured to one of the gate posts 2 and 3. The lower brackets 6 are disposed in spaced relationship to the ground X and substantially at the level of the conductor wire 1, the upper brackets 5 being disposed in vertically spaced relationship to the lower brackets 6. The brackets 5 and 6 are in a vertical plane extending transversely of the passage 4 between the gate posts 2 and 3, and may be secured to their respective gate posts 2 and 3 by any suitable means. Each of the lower brackets 6 is formed to provide an angularly upwardly projecting pintle 7 on each of which is loosely mounted a bushing 8. The bushings 8 are made from any suitable electrical insulating material such as glass, porcelain, hard rubber, or the like. A pair of metallic barrier members in the nature of electrical conductor rods 9 and 9' have their inner ends each secured to one of the bushings 8 as indicated at 10 and normally extend transversely of the passageway 4 toward the opposite gate post, the free end portions thereof being in substantially side-by-side relationship. The upper brackets 5 are each provided with an angularly downwardly projecting pintle-forming portion 11 on which is mounted an insulator bushing or the like 12. It will be noted that the pintles 11 are in laterally offset relationship with respect to their corresponding lower pintles 7 and in axial alignment therewith, the offset being in a vertical plane extending transversely of the passageway 4. It will be further noted that the pintles 7 and 11 of each pair of brackets 5 and 6 are in axial alignment, the common axis of each pair of pintles inclining toward the opposite side of the passageway 4. Preferably and as shown, the lower ends of the pintle portions 11 are inturned as at 13 to limit downward axial movement of the insulators 12.

The gate post 2 is provided with lower and upper insulators 14 and 15 respectively, the former being substantially on a level with the insulator bushings 8 and the latter being substantially level with the insulators 12. For the purpose of the present example, it may be assumed that the conductor wire encircles the field to be enclosed and has its opposite end portions disposed at the gate posts 2 and 3. One end portion 16 of the wire 1 is secured to the insulator 14 on the gate post 2 and extends upwardly and laterally over the insulator bushing 15 to its corresponding insulator bushing 12 to which it is secured. The end portion 16 extends from thence to the electrical conductor rod barrier 9 to which the extreme end is secured fast as indicated at 17 in outwardly spaced relationship to the insulator bushing 8 associated with the post 2. The opposite end portion 18 of the conductor wire 1 is secured to an insulator 19 on the post 3 and extends from thence upwardly and laterally outwardly over an insulator 20 substantially at a level with the insulator 12 on the bracket 5 adjacent thereto. Said end portion 18 extends from the insulator 12 associated with the gate post 3 angularly downwardly to the conductor rod barrier member 9' to which the extreme end is made fast as indicated at 21 in laterally outwardly spaced relationship to its corresponding bushing 8.

As shown, when the barrier rods 9 and 9' are in their normal passage-closing position, indicated in Fig. 1, and their outer end portions are in substantially side-by-side relationship, it should be noted that the conductor wire 1 or at least the end portions 16 and 18 thereof are flexible to permit lateral swinging movements of their respective barrier members 9 and 9' from their normal passage-closing positions transversely of the passageway 4 to passage-opening positions at their respective sides of the passageway. The inclination of the axes of the opposite pairs of pintles 7 and 11 and the connections of the conductor end portions 16 and 18 to their respective barrier rods 9 and 9' and insulators 12 positively impart lifting movements to the free ends of the barrier rods when they are pivotally moved or swung to their passage-opening positions. Thereafter upon being released, the barrier rods 9 and 9' will automatically swing inwardly and downwardly to their normal horizontal passage-closing positions under the action of gravity.

From the above, it should be obvious that a tractor, truck, or other automotive vehicle may be driven through the passageway 4 without the necessity of the operator's dismounting from the vehicle and manually opening the barrier. The operator merely drives the vehicle against the barrier rods 9 and 9', engagement of the vehicle therewith causing said barriers to swing laterally outwardly about the axes of their respective pintles. After the vehicle has traveled through the passageway 4, the barriers 9 and 9' gravitate to their normal passage-closing positions. Of course, a circuit would be closed between the barrier rods 9 and 9' and the ground X with passage of the vehicle through the passageway 4, but the current would travel through the vehicle without the operator thereof being effected thereby; whereas an animal coming in contact with either or both of the barrier rods 9 and 9' would immediately receive sufficient shock to discourage it from attempting to open the gate.

While I have shown a pair of cooperating movable barriers 9 and 9', it will be appreciated that a single barrier could be mounted from but one gate post and extend transversely of the passageway 4 to a point closely adjacent the opposite gate post. It will also be understood that my novel structure may be further modified without departure from the spirit and scope of the invention as defined in the claims.

What I claim is:

1. In an electric gate, bracket means adapted to be secured to a supporting element in spaced relation to the ground and defining a pintle, a bushing mounted on said pintle, a barrier comprising an electrical conductor rod connected at its inner end to said bushing for combined lateral and inclined swinging movements about the axis of said pintle from a normal gate-closed position substantially parallel to the ground to an inclined gate-open position, an insulator mounted on said bracket means in vertically spaced relation to the bushing and laterally offset with respect thereto toward the free outer end of said rod in a vertical plane extending longitudinally of the barrier in its gate-closed position, and electrical conductor means interposed between said insulator and said barrier rod, said conductor means supporting the barrier longitudinally outwardly of the inner end thereof and positively imparting lifting movements to the outer end thereof upon swinging movement of said barrier toward its gate-open position.

2. In an electric gate, bracket means adapted to be secured to a supporting element in spaced relation to the ground and at one side of a passageway, said bracket means defining upper and lower axially aligned pintles, a pair of insulator bushings one each journalled on each of said pintles, a barrier comprising an electrical conductor rod secured at its inner end to the bushing on said lower pintle for lateral and inclined swinging movements from a normal gate-closed position substantially parallel to the ground to an inclined gate-open position, the common axis of said pintles inclining outwardly from said supporting element and being disposed in a vertical plane extending longitudinally of the conductor rod in its gate-closed position, and an electrical conductor element interposed between said conductor rod intermediate its ends and said bushing on the upper one of said pintles, whereby to support said conductor rod and positively impart lifting movements to the free outer end thereof responsive to said swinging of the barrier about the axis of said pintles and toward its gate-open position.

3. In an electric gate, a supporting post defining one side of a passageway, upper and lower insulators on said supporting post, an electrical conductor wire secured intermediate its ends to said lower insulator and having one portion thereof extending laterally therefrom in one direction to provide a fence, bracket means secured to said post, said bracket means including a pair of axially aligned upper and lower pintles, a pair of insulator bushings one each journalled on each of said pintles, a barrier comprising an electrical conductor rod secured at its inner end to the bushing on said lower pintle for lateral and inclined swinging movements from a normal gate-closed position substantially parallel to the ground and at a common level with the laterally extended portion of said conductor wire to an inclined gate-open position, the common axis of said pintles inclining outwardly from said supporting post and being disposed in a vertical plane extending longitudinally of the conductor rod in its gate-closed position, another portion of said conductor wire extending over the upper one of said insulators on the supporting post and being secured to said upper bushing, said other portion of the conductor wire extending to and having its end mounted fast to the intermediate portion of said barrier whereby to support the same and impart lifting movements to the free outer end thereof responsive to swinging movements of said barrier about the axis of said pintles and toward its gate-open position.

ALOYS H. MEYER, Jr.

REFERENCES CITED

The following references are of record in the file of this patent:

UNITED STATES PATENTS

| Number | Name | Date |
| --- | --- | --- |
| 1,359,764 | Somers | Nov. 23, 1920 |
| 2,540,562 | Wood | Feb. 6, 1951 |